United States Patent
Conway et al.

(10) Patent No.: US 11,933,880 B2
(45) Date of Patent: Mar. 19, 2024

(54) RADAR SYSTEM FOR DETECTING PROFILES OF OBJECTS, PARTICULARLY IN A VICINITY OF A MACHINE WORK TOOL

(71) Applicant: RodRadar Ltd., Rinatya (IL)

(72) Inventors: Simon Conway, Leamington Spa (GB); Thomas James Martin, Peterborough (GB); John Francis Roulston, Edinburgh (GB)

(73) Assignee: RodRadar Ltd., Rinatya (IL)

( * ) Notice: Subject to any disclaimer, the term of this patent is extended or adjusted under 35 U.S.C. 154(b) by 569 days.

(21) Appl. No.: 16/945,879

(22) Filed: Aug. 2, 2020

(65) Prior Publication Data

US 2021/0033723 A1 Feb. 4, 2021

(30) Foreign Application Priority Data

Aug. 2, 2019 (GB) ..................................... 1911097

(51) Int. Cl.
*G01S 13/88* (2006.01)
*E02F 9/26* (2006.01)
(Continued)

(52) U.S. Cl.
CPC ............ *G01S 13/885* (2013.01); *E02F 9/261* (2013.01); *G01S 7/003* (2013.01); *G01S 13/86* (2013.01); *G01V 3/12* (2013.01)

(58) Field of Classification Search
CPC ........ G01S 13/885; G01S 7/003; G01S 13/86; E02F 9/261; G01V 3/12
See application file for complete search history.

(56) References Cited

U.S. PATENT DOCUMENTS 5,479,729 A 1/1996 Eslambolchi
5,720,354 A 2/1998 Stump et al.
(Continued)

FOREIGN PATENT DOCUMENTS

CN 104701617 A 6/2015
CN 209045736 U 6/2019
(Continued)

OTHER PUBLICATIONS

GB Search and Examination Report for corresponding GB application GB1911097.2 dated Jan. 14, 2020.
(Continued)

*Primary Examiner* — Matthew M Barker
(74) *Attorney, Agent, or Firm* — HEIDI BRUN ASSOCIATES LTD.

(57) ABSTRACT

An implement for use with an excavator includes a lightweight housing, a first coupling feature, a ground penetrating radar antenna, a controller, a wireless communication circuit and a rotation unit. The lightweight housing has an upper surface, a lower surface and a cavity. The first coupling feature is located on the upper surface and cooperates with a second coupling feature on an excavator arm. The ground penetrating radar antenna is mounted near the lower surface. The controller is mounted within the cavity and provides outgoing signals to the radar antenna, receives incoming signals from the radar antenna and interprets the incoming signals so as to provide implement output information. The wireless communication circuit is mounted within the cavity and transmits the implement output information. The rotation unit is mounted within the cavity and rotates the housing vis-à-vis the excavator arm.

15 Claims, 8 Drawing Sheets

(51) Int. Cl.
*G01S 7/00* (2006.01)
*G01S 13/86* (2006.01)
*G01V 3/12* (2006.01)

(56) References Cited

U.S. PATENT DOCUMENTS

| | | | |
|---|---|---|---|
| 6,388,629 B1 * | 5/2002 | Albats, Jr. | G01S 13/0209 342/158 |
| 7,170,440 B1 * | 1/2007 | Beckner | H01Q 9/28 342/194 |
| 7,345,617 B2 * | 3/2008 | Friborg | G01V 3/15 342/21 |
| 9,280,898 B1 | 3/2016 | Richmond et al. | |
| 11,085,170 B2 * | 8/2021 | Roulston | E02F 3/841 |
| 11,492,777 B2 * | 11/2022 | Kurokawa | E02F 9/2033 |
| 2003/0197420 A1 | 10/2003 | Burton | |
| 2006/0026101 A1 | 2/2006 | Ogura et al. | |
| 2011/0006772 A1 | 1/2011 | Olsson et al. | |
| 2014/0285375 A1 * | 9/2014 | Crain | G01S 17/86 342/25 A |
| 2017/0323480 A1 | 11/2017 | LaBarca | |
| 2018/0127952 A1 | 5/2018 | Magliulo et al. | |
| 2018/0230666 A1 | 8/2018 | Penza et al. | |
| 2019/0112792 A1 | 4/2019 | Reed | |

FOREIGN PATENT DOCUMENTS

| | | |
|---|---|---|
| EP | 3730700 A1 | 10/2020 |
| GB | 2533489 A | 6/2016 |
| GB | 2570279 A | 7/2019 |
| JP | 2004245454 A | 9/2004 |
| WO | 2019124549 A1 | 6/2019 |

OTHER PUBLICATIONS

International Search Report for corresponding international application PCT/IL2020/050847 dated Sep. 29, 2020.
Examination Report issued in corresponding GB Application No. dated Apr. 12, 2023.
Examination Report for corresponding GB application GB1911097.2 dated Sep. 18, 2023.

* cited by examiner

RADAR SYSTEM FOR DETECTING PROFILES OF OBJECTS, PARTICULARLY IN A VICINITY OF A MACHINE WORK TOOL

CROSS REFERENCE TO RELATED APPLICATIONS

This application claims priority from GB patent application 1911097.2, filed Aug. 2, 2019, which is incorporated herein by reference.

FIELD OF THE INVENTION

The disclosure relates to the field of radar systems, particularly for compact, close range applications. One application would be ground penetration radar in the context of a machine work tool for connection to an excavator arm.

BACKGROUND OF THE INVENTION

Radar systems that detect the presence of objects in an environment are well known, including ground penetrating radar systems. GB2570279, which is commonly owned, discloses a radar antenna integrated with an excavator bucket for use with a machine such as an excavator.

The volume of hardware necessary to provide radar functionality may occupy a significant proportion of volume that might otherwise be available as bucket excavation volume. Accordingly, it is known to minimize the hardware located in and around an excavator bucket so as to maximize bucket excavation volume. To achieve this, hardware that can be located remote from the radar antenna may be located on the machine. This necessitates cabling, such as for provision of power, between the machine and the bucket. The necessity to couple cabling between the bucket and the machine means that an operator needs to facilitate that coupling manually, which means that the benefits of quick couplers (which can facilitate coupling remotely from the machine cab) are reduced. The time taken to switch between implements (such as excavator buckets of different sizes), and the associated inconvenience, is therefore significantly increased.

SUMMARY OF THE PRESENT INVENTION

There is therefore provided, in accordance with a preferred embodiment of the present invention, an implement for use with an excavator. The implement includes a lightweight housing, a first coupling feature, a ground penetrating radar antenna, a controller, a wireless communication circuit and a rotation unit. The lightweight housing has an upper surface, a lower surface and a cavity. The first coupling feature is located on the upper surface and cooperates with a second coupling feature on an arm of an excavator. The ground penetrating radar antenna is mounted near the lower surface. The controller is mounted within the cavity and provides outgoing signals to the radar antenna, receives incoming signals from the radar antenna and interprets the incoming signals so as to provide implement output information. The wireless communication circuit is mounted within the cavity and transmits the implement output information. The rotation unit is mounted within the cavity and rotates the housing vis-à-vis the excavator arm.

Moreover, in accordance with a preferred embodiment of the present invention, the implement also includes a battery mounted within the cavity and configured to supply power at least to the controller, the rotation unit and to the wireless communication circuit.

Further, in accordance with a preferred embodiment of the present invention, a battery charger for charging the battery is mounted within the cavity.

Still further, in accordance with a preferred embodiment of the present invention, the implement includes a battery charger cable having a stowed configuration in which the battery charger cable is accommodated within the cavity and a deployed configuration in which the battery charger cable extends outside the cavity for connection to an external power source.

Moreover, in accordance with a preferred embodiment of the present invention, the controller determines an axial orientation of a line target from the output of the antenna during the rotation.

Further, in accordance with a preferred embodiment of the present invention, the axial orientation is the rotation angle at which the antenna achieves a maximum signal value.

Still further, in accordance with a preferred embodiment of the present invention, the controller instructs the excavator to move radially after each of at least two rotations to scan an item of interest and to determine whether or not the item of interest is a line target from the output of the antenna during the scans.

Moreover, in accordance with a preferred embodiment of the present invention, the implement includes a levelling device configured to provide data to assist in controlling the second surface to be horizontal.

Further, in accordance with a preferred embodiment of the present invention, the implement includes a geolocation antenna for providing geolocation data in relation to the implement.

Still further, in accordance with a preferred embodiment of the present invention, the implement includes a vector sensor configured to monitor motion of the implement.

Moreover, in accordance with a preferred embodiment of the present invention, the implement includes an electromagnetic radiation sensor configured to detect electromagnetic radiation emitted by buried articles; wherein the controller is configured to receive data from the electromagnetic sensor, wherein the implement output data includes data derived from the electromagnetic sensor.

Further, in accordance with a preferred embodiment of the present invention, the implement includes an electromagnetic radiation emitter configured to induce electromagnetic radiation in an target article for sensing by the electromagnetic radiation sensor.

There is also provided, in accordance with a preferred embodiment of the present invention, a machine assembly including the implement and a machine having an excavator arm configured to receive the implement.

Moreover, in accordance with a preferred embodiment of the present invention, the machine assembly includes a computing device configured to receive the implement output information transmitted by the wireless communication circuit configured to transmit and to generate a graphical representation of the implement output information for viewing by an operator of the machine assembly.

Further, in accordance with a preferred embodiment of the present invention, the computing device is a portable wireless device.

Still further, in accordance with a preferred embodiment of the present invention, the machine includes the second coupling feature. The second coupling feature is hydraulically or electrically actuatable to engage with and disengage from the first coupling feature.

There is also provided, in accordance with a preferred embodiment of the present invention, a method for an implement for use with an excavator. The method includes having a radar implement rotatably connected to an arm of the excavator, the radar implement having a ground penetrating radar at a lower surface thereof, rotating the radar implement to a first angle, the arm radially moving the radar implement while maintaining the first angle, collecting output of the ground penetrating radar during the moving, rotating the radar implement to a second angle generally orthogonal to the first angle, the arm radially moving the radar implement while maintaining the second angle, and collecting output of the ground penetrating radar during the second moving.

Moreover, in accordance with a preferred embodiment of the present invention, the method includes declaring a line target if the output of the first or second collecting is generally hyperbolic.

Finally, in accordance with a preferred embodiment of the present invention, the method includes determining the direction of the line target from a strength of the output of the first or second collecting.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features, and advantages thereof, may best be understood by reference to the following detailed description when read with the accompanying drawings in which:

Figure 1:
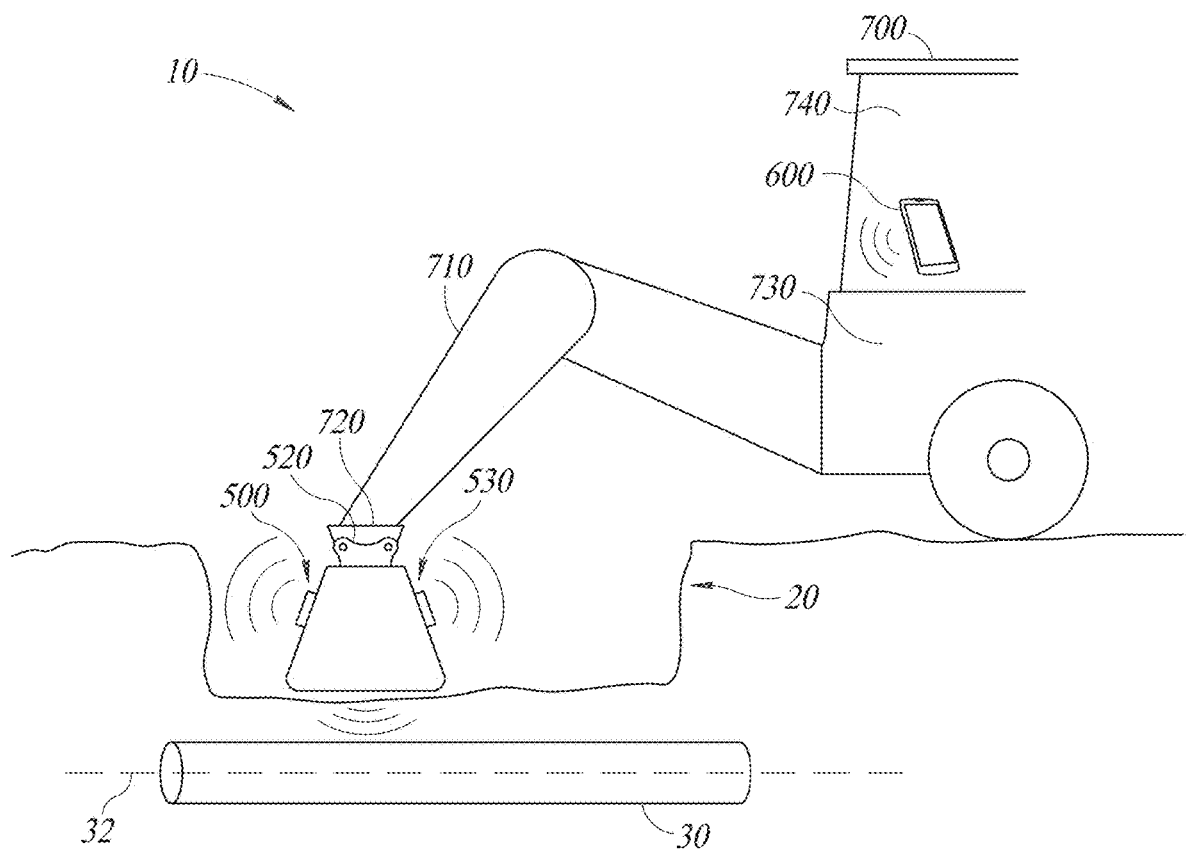
FIG. 1 shows a schematic representation of an excavator with a radar implement in accordance with the present disclosure connected to an arm of the excavator and in the context of an excavation site.

It will be appreciated that for simplicity and clarity of illustration, elements shown in the figures have not necessarily been drawn to scale. For example, the dimensions of some of the elements may be exaggerated relative to other elements for clarity. Further, where considered appropriate, reference numerals may be repeated among the figures to indicate corresponding or analogous elements.

DETAILED DESCRIPTION OF THE PRESENT INVENTION

In the following detailed description, numerous specific details are set forth in order to provide a thorough understanding of the invention. However, it will be understood by those skilled in the art that the present invention may be practiced without these specific details. In other instances, well-known methods, procedures, and components have not been described in detail so as not to obscure the present invention.

Applicant has realized that a lightweight radar implement, which can be easily switched with the bucket via a quick coupler that allow buckets to be dropped and changed without the driver getting out of the cab, provides advantages. Hence, if an operator were uncertain about what might lie in his intended digging spot, he could drop his bucket, pick up the lightweight radar implement and scan the work area with the implement to locate hazards. With knowledge of the hazard location, the operator could quickly replace the implement with the bucket and proceed with some knowledge of hazard location and depth, thus reducing the uncertainty of the dig.

Applicant has also realized that, since power and data cables are not required, the radar implement may be connected to the excavator arm and disconnected from the excavator arm using only a quick coupler.

Furthermore, since the radar implement does not serve as an excavation bucket, it can be lightweight and with significantly less metal. This reduces the effect of a metal construction on radar performance and reduces its price.

FIG. 1 shows a lightweight radar implement 500, in accordance with the present disclosure, attached to an excavator arm 710 of an excavator 700 and shown in the context of an excavation site 10.

Excavator 700 may be used to dig a trench 20 using its regular digging bucket and may switch to using radar implement 500 to detect buried objects 30 in order to avoid damage to, for example, underground cables, pipes and other articles.

The excavator 700 may comprise an excavator body 730 including a cab 740, and an excavator arm 710 projecting from the excavator body 730. The excavator arm 710 may comprise, at a distal end, an arm coupling feature 720.

The radar implement 500 may comprise an implement coupling feature 520. The arm coupling feature 720 may be configured to cooperate with the implement coupling feature 520 such that the implement 500 may be straightforwardly attached to and detached from the arm 710.

The combination of arm coupling feature 720 and implement coupling feature 520 may form part of a coupler which may facilitate the attachment and detachment of the implement 500. In a so-called quick coupler, the arm coupling feature 720 may be hydraulically or electrically actuated by actuators on the excavator arm 710 to engage with and disengage from the implement coupling feature 520. In this way, the implement 500 may be attached and detached by hydraulic or electrical actuators that are controlled from the cab 740 of the excavator 700 without the need for manual intervention.

Figure 2:
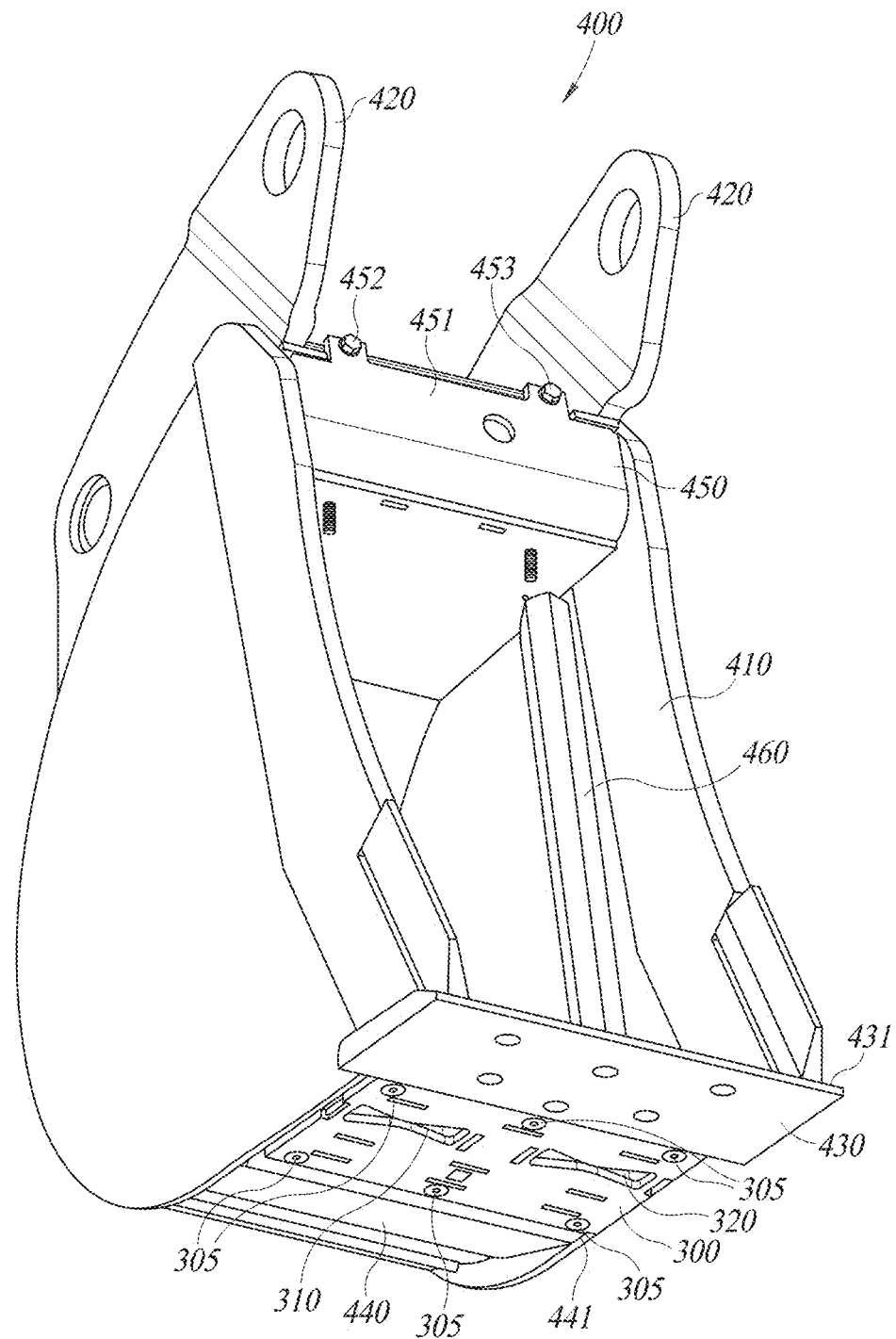
FIG. 2 shows an excavator bucket in accordance with the prior art having an integrally mounted radar antenna on a base of the bucket.

GB2570279, copied here as FIG. 2, shows an excavator bucket 400 that incorporates an antenna assembly 300 and a radar control module (not shown) in a top cavity 450 of the excavator bucket 400.

The excavator bucket 400 may comprise a bucket cavity 410 for containing excavated material, a bucket coupling feature 420 for attachment of the excavator bucket 400 to an excavator (not shown), a bucket blade 430 comprising a front face 431 for cutting into a ground surface or other material to be excavated, and a bottom panel 440 that provides a surface of the excavator bucket 400 that sits adjacent the bucket blade 430. The bottom panel 440 may be above the bucket blade 430 when the excavator bucket 400 is in an orientation such that the bucket blade 430 is in a vertical orientation above a surface into which the bucket blade 430 is preparing to cut.

The excavator bucket 400 may further comprise the top cavity 450, enclosed within the bucket cavity 410 at an opposing face of the bucket 400 relative to the bottom panel 440 and bucket blade 430. The top cavity 450 may comprise a removable panel 451 attached in position by fasteners 452, 453.

The excavator bucket 400 may further comprise one or more conduits 460 within the bucket cavity providing a connection between the bottom panel 440 and the top cavity 450.

The bottom panel 440 may comprise a recess 441 into which is mounted the antenna assembly 300 comprising the transmitter antenna 310 and the receiver antenna 320.

The top cavity 450 may contain the radar control module that comprises a digital PCB and an analogue PCB.

Coaxial cables facilitate communication between the antenna assembly 300 and the radar control module. The coaxial cables may be channeled in the conduits 460.

Referring to FIG. 2, a plurality of fasteners 305 may be employed to fasten the antenna assembly 300 into the recess 441 in the bottom panel 440 of the excavator bucket 400. The fasteners may be mounted such that they do not protrude beneath the surface of the bottom panel 440. In this way they are less vulnerable to damage. By contrast, the fasteners may be mounted such that they do protrude above an inner surface of the bucket cavity 410. This is to enable the fasteners to be ground away (for example with an angle grinder) more easily in the event of a need to substitute the antenna assembly 300. While releasable fasteners may be employed, use of an excavator bucket for its intended purposes often means that fasteners may be bent or damaged, meaning that the most efficient method of removing the fasteners may be to grind them away.

Accordingly, it can be seen that in order to provide the antenna assembly 300 and a radar control module in the context of an excavator bucket 400, the bucket excavation volume is reduced. Furthermore, the antenna assembly 300 is located in a vulnerable position given its proximity to the cutting edge. Furthermore, the control electronics is separated from the antenna assembly 300 and connections are made via coaxial cables in conduits 460 which are located within the excavator bucket, thus reducing available volume and being vulnerable to potential damage. Furthermore, hardware for processing the output of the radar control module is not accommodated within the bucket due to volume constraints. Further, power for the antenna assembly 300 and control module must be provided via cables that run along the excavator arm to a power supply of the excavator body. The need for such cables means that quick coupling functionality alone cannot provide all the necessary connectivity. This means that connection and disconnection of the excavator bucket 400 of the type shown in FIG. 2 is more complicated and time-consuming than for an excavator bucket without radar functionality. Furthermore, in order to provide appropriate excavator bucket properties, the bucket is largely of metal. However, metal may compromise radar functionality.

Figure 3:
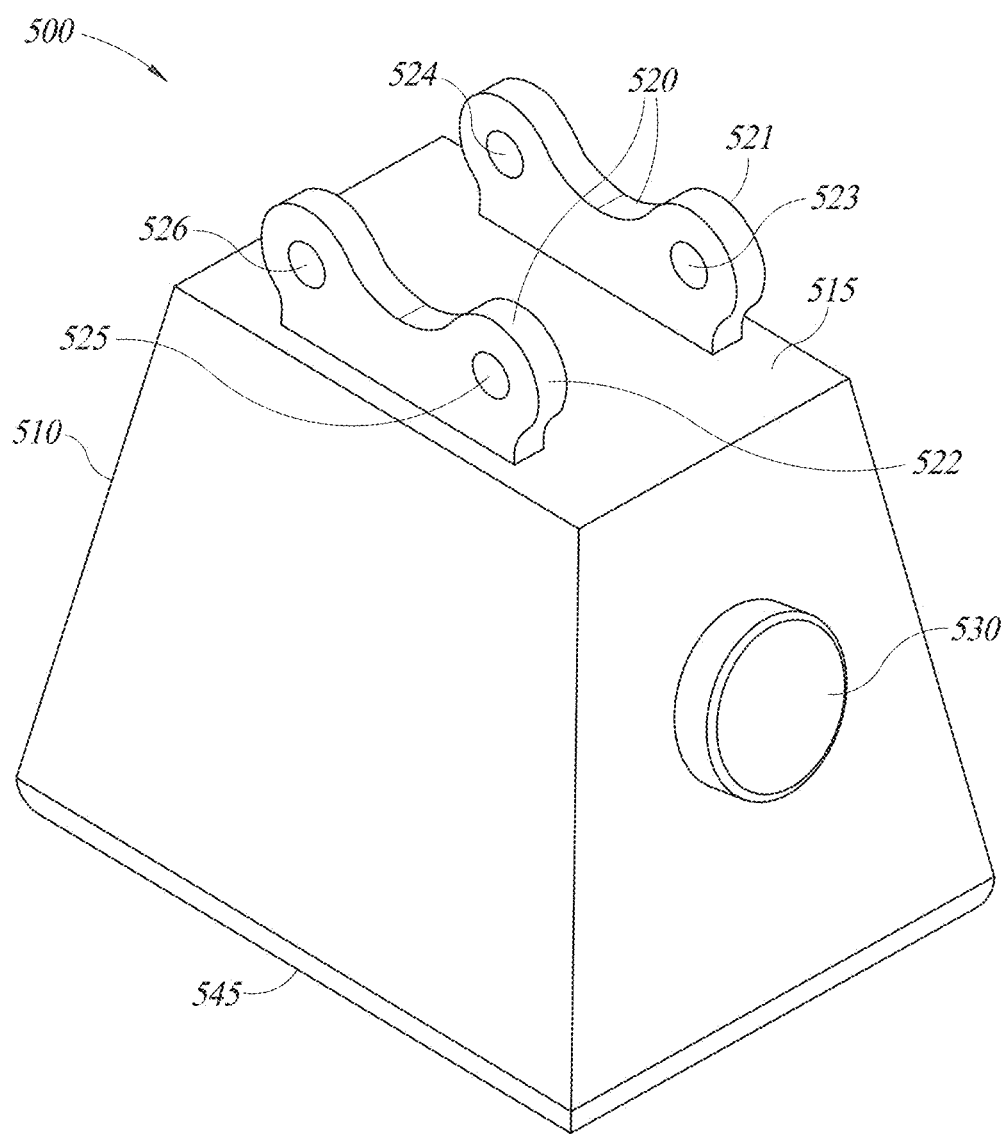
FIG. 3 shows a schematic exterior view of a radar implement in accordance with the present disclosure.

By contrast, the radar implement 500 of the present disclosure, an example of which is shown in FIG. 3, can be attached and detached from the implement arm using only regular coupler features. This means that no additional cables or other features require attachment in order to obtain the full radar functionality. Furthermore, the radar implement 500 may be lightweight yet durable and may comprise an exterior casing 510 which may be formed of cross-linked polymer, glass-fiber loaded nylon or aluminum or almost any industrial plastic or composite. It will be appreciated that such materials are less likely to compromise radar functionality than metal.

The first surface 515 of the radar implement 500 comprises the implement coupling feature 520. A second surface 545 of the radar implement 500, opposite the first surface, comprises a radar antenna assembly 540 as explained in further detail below. The second surface 545, at least, may be of a hardwearing plastic such as polyurethane having a shore hardness of D60. Since the second surface 545 may be worn down through contact with the ground, second surface 545 may also comprise a sacrificial plastic plate (not shown) to allow easy repair.

Figure 4A:
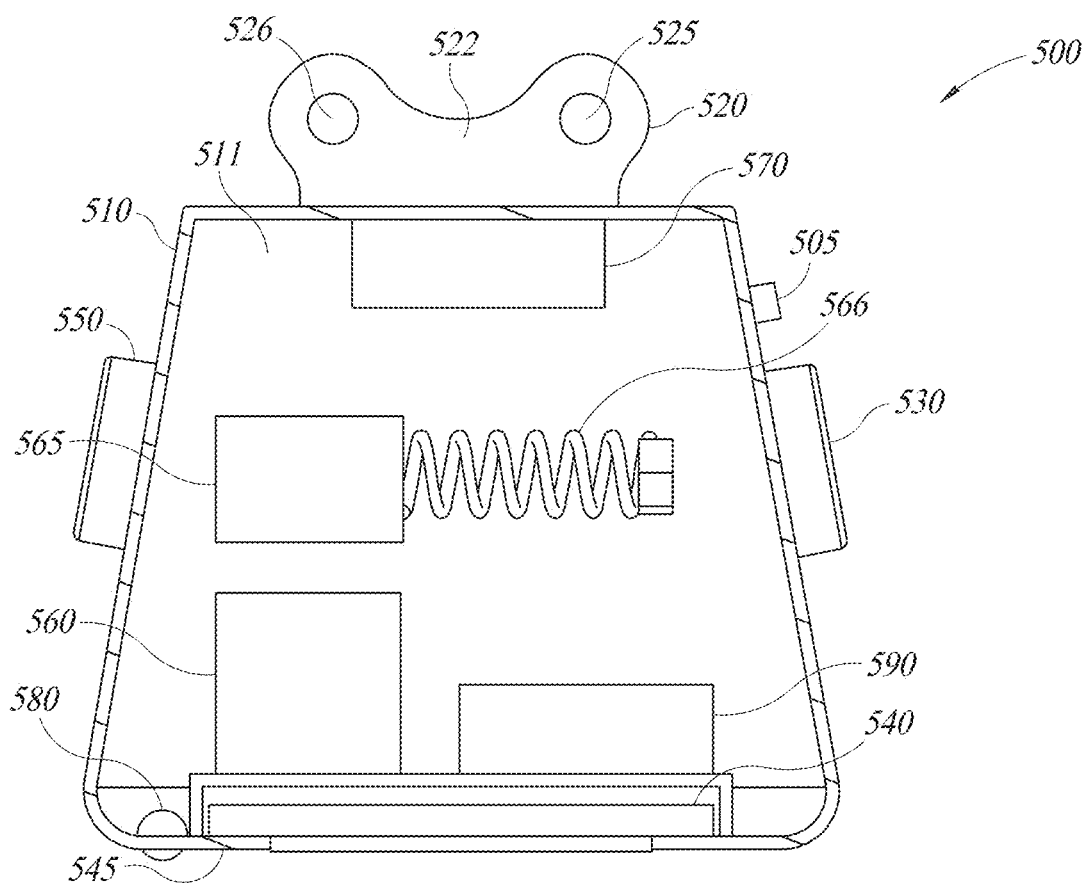
FIG. 4A shows a schematic cross-sectional view of the electric elements of radar implement of FIG. 3.

The radar implement 500 further comprises a geolocation antenna 530 mounted on an exterior surface 510 of the casing 510. Referring to FIG. 4A, the radar implement 500 further comprises a data communications antenna 550 mounted on an exterior surface 510 of the casing. The radar implement 500 further comprises a vector sensor 580 mounted on the second surface 545 of the exterior casing 510.

Referring again to FIG. 4A, the radar implement 500 further comprises an interior cavity 511 within the exterior casing 510. The interior cavity 511 contains a controller (scanning control module) 590, a battery 560, a battery charger 565, and a self-levelling module 570 for assisting in maintaining a level orientation of the radar implement 500. The interior cavity 511 may also contain a battery charger cable 566.

The interior cavity 511 may be accessible through a door in the casing 510 of the radar implement 500, or through a removable panel of the casing 510 or through other means. This facilitates a stowed configuration of the battery charger cable 566, in which the battery charger cable 566 is accommodated within the cavity, as well as a deployed configuration, in which at least one end of the battery charger cable 566 extends outside the cavity for connection to an external power source. In this way, the battery may easily be charged but also the battery charging hardware may be discreetly stowed on-board the radar implement 500 when not in use so as not to interfere with operation of the radar implement 500. Alternatively, battery 560 could be recharged without connectors by incorporating induction charging, as is typical in mobile phones and other mobile computing devices.

The radar implement may further comprise a status indicator 505 on an exterior of the casing 510.

In this way, all of the functionality required to obtain and transmit radar data is located within the radar implement 500.

In particular, power is supplied by the battery 560 to the other components as necessary. Radio frequency waves are transmitted by the antenna assembly 540 and reflected radio frequency waves are received by the antenna assembly 540. The scanning control module 590 governs the transmitted radio frequency waves and interprets the reflected radio frequency waves.

The geolocation antenna 530 is configured to obtain geolocation data for processing by the antenna assembly.

Data obtained by the radar implement 500 may be transmitted from the radar implement 500 using the data communications antenna 550. The data communications antenna 550 may comprise a WiFi antenna, a Bluetooth Antenna or any other suitable communications antenna.

The vector sensor 580 may provide motion information regarding motion of the radar implement 500. In one embodiment, the vector sensor 580 may comprise a wheel that runs along a surface being scanned such that, with knowledge of the wheel diameter, the position of the radar implement 500 may be tracked as it travels in a straight line. In another embodiment, the vector sensor 580 may comprise a track ball that runs along a surface being scanned such that, with knowledge of the ball diameter, the position of the radar implement 500 may be tracked as it travels in various directions, including an arc and a straight line.

Returning to FIG. 3, the implement coupling feature 520 comprises a pair of parallel flanges 521, 522 which project from the first surface. A first flange 521 of the pair of parallel flanges comprises a pair of orifices 523, 524 while a second flange 522 of the pair of parallel flanges comprises a pair of orifices 525, 526. A first pin (not shown) may extend through a first orifice 523 of the pair of orifices of the first flange and a first orifice 525 of the pair of orifices of the second flange. Similarly, a second pin (not shown) may extend through a second orifice 524 of the pair of orifices of the first flange and a second orifice 526 of the pair of orifices of the second flange.

The arm coupling feature (not shown) may be configured to attach to the pair or pins or detach from the pair of pins through actuation of one or both of a pair of claws, as is known in the art. Such actuation may be hydraulic, electrical or any other type of suitable actuation.

Other attachment and detachment mechanisms are envisaged and fall within the scope of the disclosure.

Data transmitted by the communications antenna 550 may be received by a mobile device, such as a site engineer's tablet or smartphone, or a cab-mounted device for representation to an operator.

In this way, an analogue or digital video signal that embodies a real time video representation of subsurface features as detected by the radar system may be provided. Additional data may be provided, such as that obtained from the geolocation sensor.

Applicant has realized that the motion needed to scan for hidden infrastructure, such as pipes, cables, etc., is not the same motion as that needed for digging. The scanning motion needs to move around enough to identify the hidden infrastructure as well as its orientation. The digging motion needs to work in a relatively fixed area. As a result, having a radar system on a digging bucket, as is the case for bucket 400, requires that the digging bucket move around above the ground. This could be dangerous.

Figure 4B:
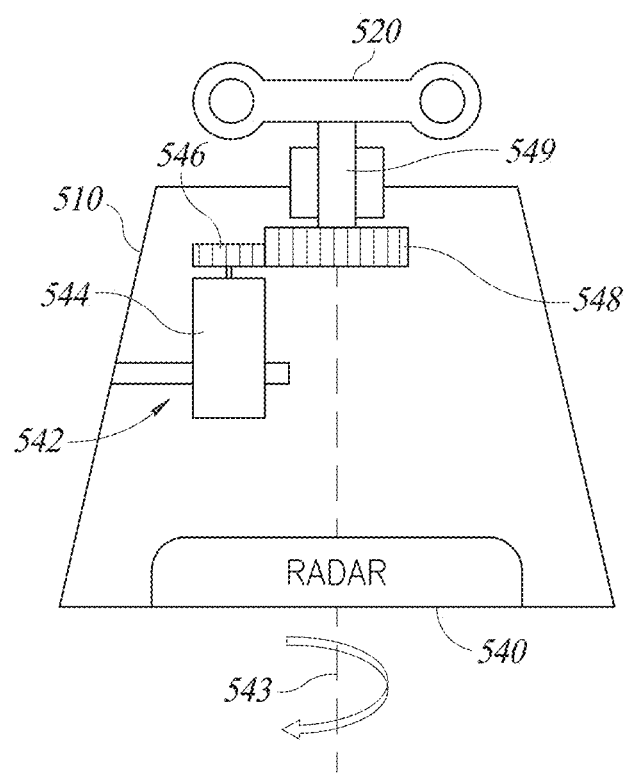
FIG. 4B shows a schematic cross-sectional view of the rotational elements of radar implement of FIG. 3.

Applicant has further realized that using lightweight radar implement 500, which can be easily switched with the bucket, easily enables radar scanning. The scanning is important as movement is essential in detecting underground objects. In accordance with a preferred embodiment of the present invention and as shown in FIG. 4B to which reference is now made, radar implement 500 further comprises a rotation unit 542 to rotate radar implement 500 about a vertical axis 543, extending through quick coupler 520, while radar assembly 540 is close to the ground.

Rotation unit 542 comprises a motor 544, rigidly fixed to casing 510, a motor gear 546 and a larger coupler gear 548. Coupler gear 548 may be connected around a shaft 549, defining vertical axis 543, forming part of coupler 520, which, in turn, may be rigidly attached to the excavator arm 710. Motor 544 may turn motor gear 546 which meshes with coupler gear 548 on shaft 549. Since coupler gear 548 may be stationary, the turning of motor gear 546 may rotate radar implement 500 around shaft 549, causing an angular rotation of antenna 540. Motor 544 may cause rotation of implement 500 on instructions from radar controller 590, typically when scanning is desired.

Typically, controller 590 may activate rotation unit 542 in response to either an activation instruction from the operator, when excavator 700 connects to radar implement 500 or when operator moves excavator arm 710. Controller 590 may also deactivation rotation unit 542 after a pre-determined interval without motion.

As mentioned hereinabove, rotation unit 542 may allow antenna 540 to be rotated. This may enable the polarization of the antenna to be aligned with a main axis 32 (as labelled in FIG. 1) of line target 30, such as a wire or pipe. Applicant has realized that antenna 540 may generate a stronger signal when a main axis of antenna 540 is aligned along main axis 32 of line target 30 and that rotating antenna 540 until such a stronger signal is received may enable the present invention to determine the main direction of line target 30 (pipe, wire, etc.).

Figure 5A:
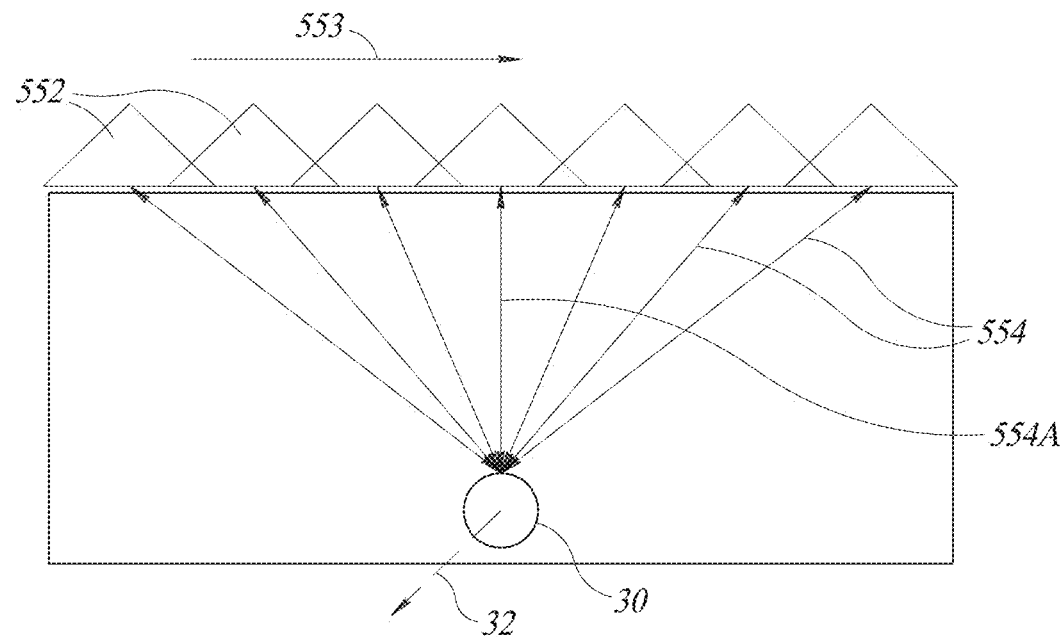
FIGS. 5A and 5B show schematic representations of the output of the radar forming part of the implement of FIG. 3 during motion transverse and parallel to a line target.
Figure 5B:
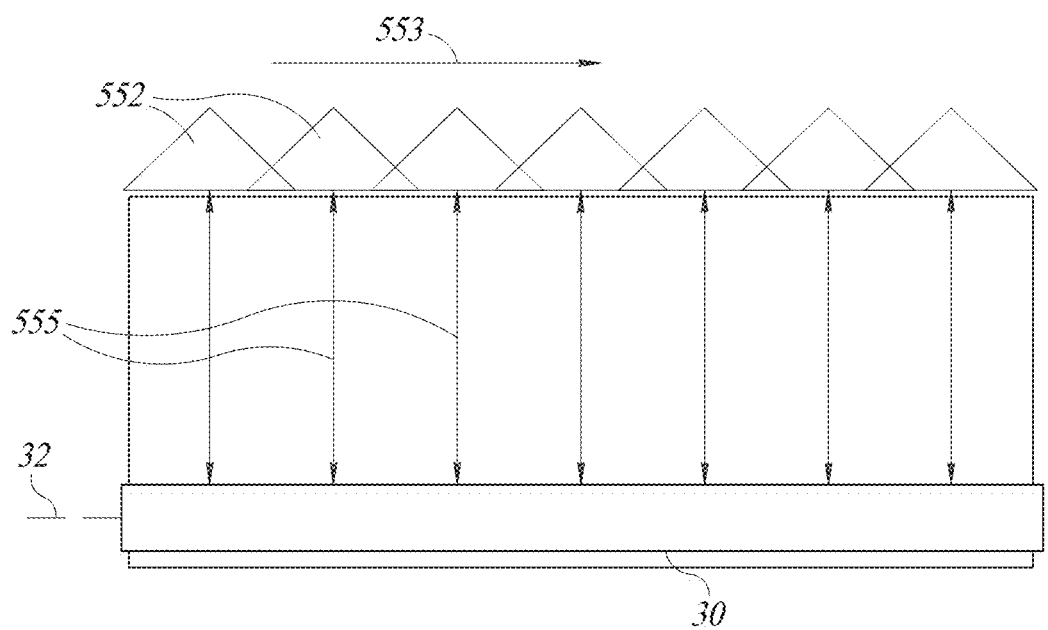

This is shown briefly in FIGS. 5A and 5B, which illustrate the output of antenna 540 when moving perpendicular to main axis 32 and in parallel to main axis 32, respectively.

The radar beam, indicated by triangles 552, is typically about 90 degrees wide and it moves to the right, indicated by arrow 553, in the examples of FIGS. 5A and 5B. Arrows 554 indicate the reflections from target 30 as radar implement 500 advances to the right above target 30. The lengths of arrows 554 indicate the measured depth in each position.

In FIG. 5A, where target 30 is perpendicular to direction 553 of the motion, the sequence of measured depths of arrows 554 fit on a hyperbola. When radar controller 590 can match a hyperbola to the sequence of measured depths, controller 590 may determine that a target 30, orientated roughly transverse to the radar motion, is present. Furthermore, controller 590 may determine the depth of target 30 and its location as defined by the turning point of the hyperbola (indicated by arrow 553A).

In FIG. 5B, where target 30 is parallel to direction 553 of the motion, the sequence of measured depths of arrows 554 do not have the characteristic hyperbolic shape. Instead, each reflection, here labelled 555, has approximately the same length and the resultant curve is close to a straight line. This is similar to the kinds of reflections which would be recorded from the different layers of material of the ground.

Accordingly, controller 590 may rotate radar implement 500 to at least two rotation angles, typically 90 degrees apart, and may instruct excavator 700 or its operator to move radially after each rotation. The result may be radial and circumferential scans which are orthogonal or close to orthogonal to each other. Further angular locations may be implemented as well.

Figure 5C:
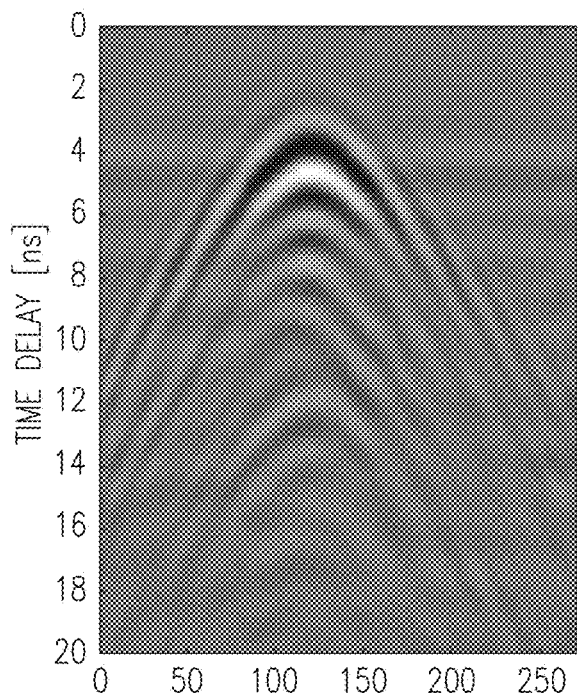
FIGS. 5C, 5D and 5E show exemplary graphs of the output of the radar when scanning at 90 degrees, 45 degrees and 0 degrees to a line target.
Figure 5D:
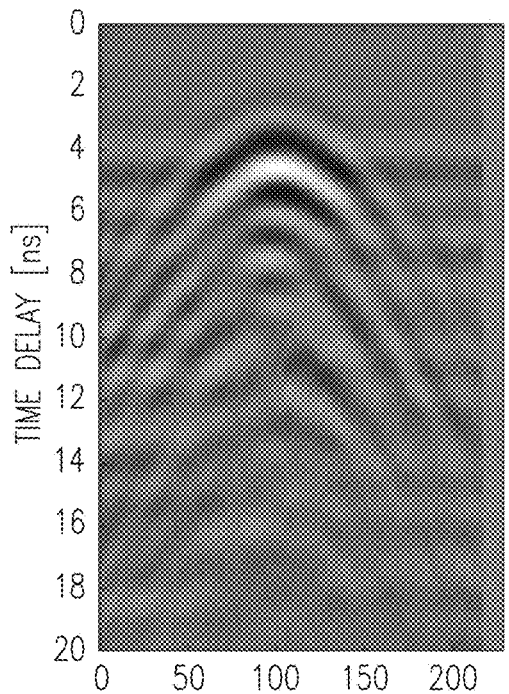
Figure 5E:
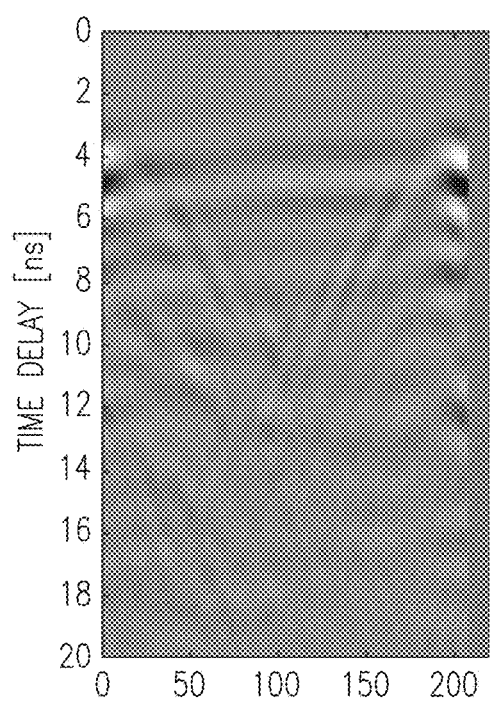

FIGS. 5C, 5D and 5E, to which reference is now briefly made, show exemplary outputs of radar implement 500 when scanning a pipe at 90 degrees (i.e. at right angles to the main axis of the pipe), at 45 degrees and at 0 deg (i.e. parallel to the main axis), respectively. Note that FIG. 5C shows the ideal hyperbolic curve and the curve in FIG. 5D is close to a hyperbolic curve. However, FIG. 5E is not hyperbolic at all. Thus, controller 590 may declare a pipe with either of the signals in FIGS. 5C and 5D.

Controller 590 may also determine the orientation of target 30 based on the fact that antenna 540 produces an electromagnetic wave whose electric field has an orientation (defined by an "E-vector") in space that is a function of the orientation of the antenna. Thus, rotating antenna 540 rotates its electric field. When the direction of the E-vector aligns with the main axis of target 30, there is a strong echo. That is because the electric field induces current in target 30 in the direction defined by the E-vector. If the target 30 is aligned, the induced current in the target 30 behaves as a long antenna, which radiates back and hence gives a strong echo. If the alignment is less than perfect, the echoing antenna is smaller, and smaller echoes are obtained.

Controller 590 may rotate radar implement 500 until it achieves a strong echo, thereby aligning the E-vector with the axis of target 30. Moreover, if there is no target 30 and there is only strata, the strength of the echo will not be dependent on alignment.

Alternatively, the rotation may be under manual control and therefore, rotation unit 542 may receive antenna rotation instructions from the operator.

Applicant has also realized that targets which do not show signal enhancement from the procedure described hereinabove may be dismissed as not being line targets and therefore, are not pipes or wires. Such targets may be boulders, voids or strata which lack the aspect ratio of the axial line target.

Figure 6:
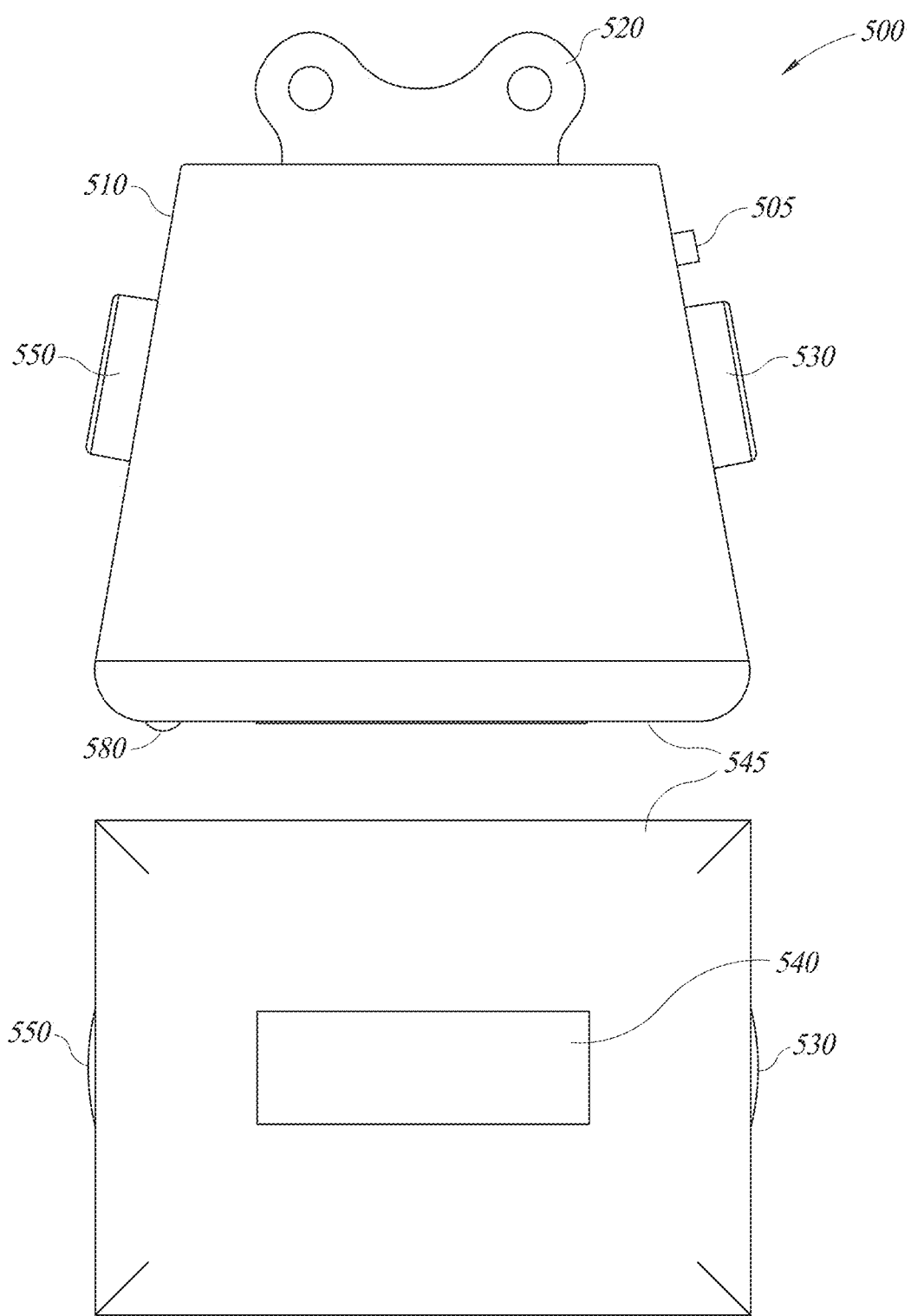
FIG. 6 shows a side and a bottom view of the radar implement of FIGS. 3 and 4.

FIG. 6 shows an embodiment of a radar implement 500 in accordance with the present disclosure having a single antenna assembly 540. The antenna assembly may comprise a transmitter and a receiver.

Figure 7:
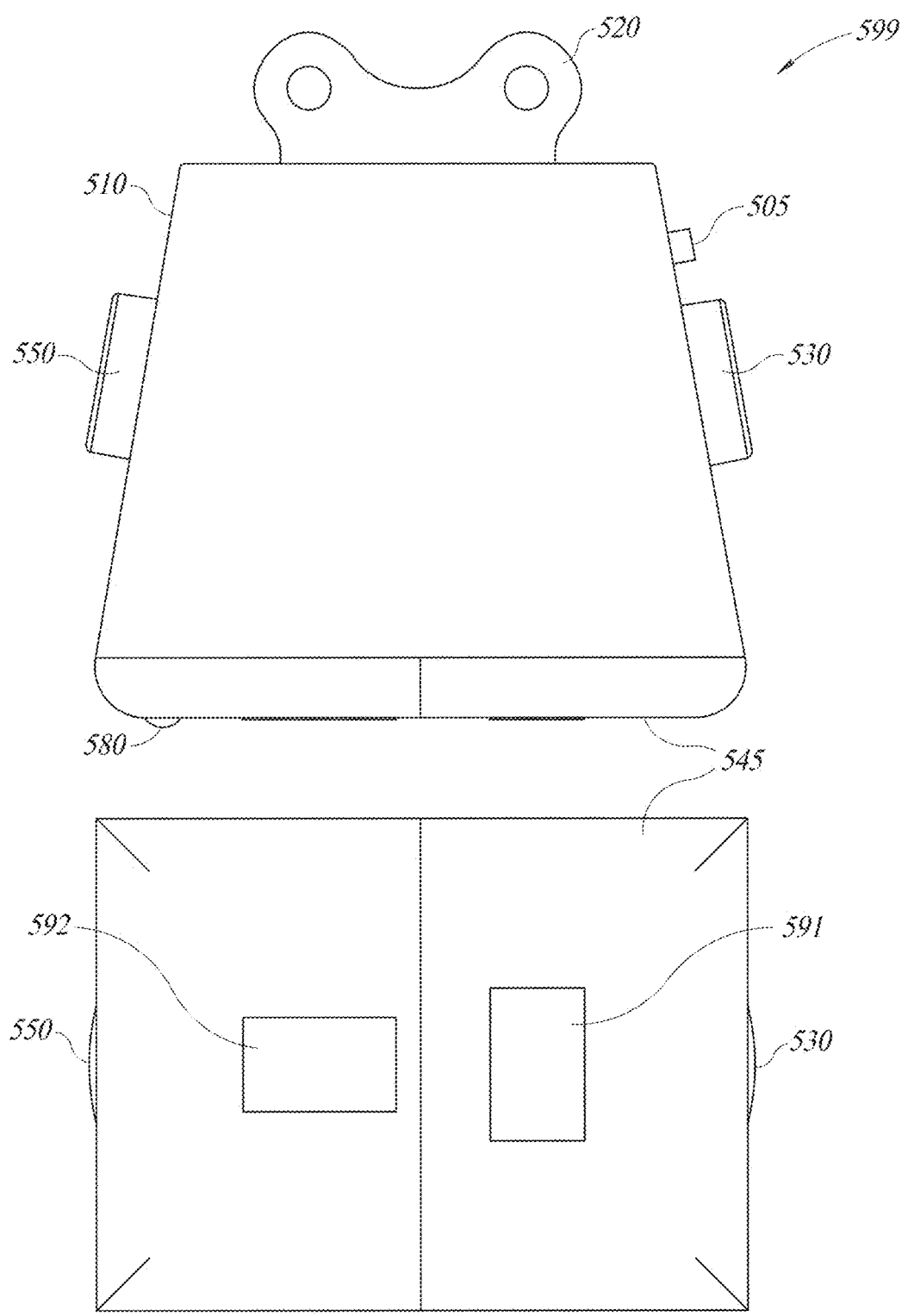
FIG. 7 shows a side and bottom view of an alternative embodiment of the radar implement of the present disclosure.

FIG. 7 shows a further embodiment of a radar implement 500 in accordance with the present disclosure having a pair of antenna assemblies 591, 592. Each of the pair of antenna assemblies 591, 592 may comprise a transmitter and a receiver. The first and second antenna assemblies 591, 592 of the pair may be oriented perpendicular to one another in order to increase an amount of information that may be obtained by the ground penetrating radar system. Rotation unit 542 may rotate antenna assemblies 591 and 592 together when attempting to determine the axial orientation of line target 30.

It may be that the provision of additional sensing functionality would enable more accurate and/or a broader range of information to be provided to an operator.

Accordingly, a radar implement 500 in accordance with the present disclosure may further comprise electromagnetic sensing functionality.

Electromagnetic sensing functionality may detect either or both electromagnetic radiation that is emitted by a buried article and electromagnetic radiation that is reflected by a buried article.

For example, the radar implement 500 may comprise a sensor configured to detect electromagnetic signals at frequencies likely to be emitted by live electricity cables. In this way, it may be possible to identify electricity cables that are in use (and to distinguish them from redundant electricity cables, or cables used for other purposes).

Alternatively, or in addition, the radar implement may comprise a sensor configured to detect VLF radio signals originating from potentially distant transmitters but re-radiated by buried metal targets acting as aerials.

Alternatively, or in addition, the radar implement may emit electromagnetic radiation specifically for the purpose of detecting effects of the emitted radiation on buried metal articles in order to assist in their identification. For example, electromagnetic induction may be effected through use of a pulsing current to induce a magnetic field in a buried metal. The induced magnetic field may then be detected in order to infer size and location of buried metal.

Any or all of these additional sensing functions may be provided using one or more additional sensors. The sensor information may be processed by the scanning control module in conjunction with the radar information and included in the implement output information for presentation to an operator.

The radar system of the present disclosure is applicable to a wide variety of industrial applications such as those referenced above. In particular, the radar system of the disclosure may be appropriate for ground penetration applications. For example, the radar system may be appropriate for use with machine work tools such that feedback may be provided to an operator in real time which allows immediate feedback prior to cutting into the ground. This enables subterranean features to be found and/or avoided as appropriate. In another example, the radar system may be appropriate for surveying applications. Surveying applications may involve mounting the radar system in a vehicle designed to complete a survey of a site perhaps by making a systematic pass (e.g. in rows or columns) across the site to be surveyed.

Unless specifically stated otherwise, as apparent from the preceding discussions, it is appreciated that, throughout the specification, discussions utilizing terms such as "processing," "computing," "calculating," "determining," or the like, refer to the action and/or processes of a general purpose computer of any type, such as a client/server system, mobile computing devices, smart appliances, cloud computing units or similar electronic computing devices that manipulate and/or transform data within the computing system's registers and/or memories into other data within the computing system's memories, registers or other such information storage, transmission or display devices.

Embodiments of the present invention may include apparatus for performing the operations herein. This apparatus may be specially constructed for the desired purposes, or it may comprise a computing device or system typically having at least one processor and at least one memory, selectively activated or reconfigured by a computer program stored in the computer. The resultant apparatus when instructed by software may turn the general-purpose computer into inventive elements as discussed herein. The instructions may define the inventive device in operation with the computer platform for which it is desired. Such a computer program may be stored in a computer readable storage medium, such as, but not limited to, any type of disk, including optical disks, magnetic-optical disks, read-only memories (ROMs), volatile and non-volatile memories, random access memories (RAMs), electrically programmable read-only memories (EPROMs), electrically erasable and programmable read only memories (EEPROMs), magnetic or optical cards, Flash memory, disk-on-key or any other type of media suitable for storing electronic instructions and capable of being coupled to a computer system bus. The computer readable storage medium may also be implemented in cloud storage.

Some general-purpose computers may comprise at least one communication element to enable communication with a data network and/or a mobile communications network.

The processes and displays presented herein are not inherently related to any particular computer or other apparatus. Various general-purpose systems may be used with programs in accordance with the teachings herein, or it may prove convenient to construct a more specialized apparatus to perform the desired method. The desired structure for a variety of these systems will appear from the description below. In addition, embodiments of the present invention are not described with reference to any particular programming language. It will be appreciated that a variety of programming languages may be used to implement the teachings of the invention as described herein.

While certain features of the invention have been illustrated and described herein, many modifications, substitutions, changes, and equivalents will now occur to those of ordinary skill in the art. It is, therefore, to be understood that the appended claims are intended to cover all such modifications and changes as fall within the true spirit of the invention.

What is claimed is:

1. An implement for use with an excavator, the implement comprising:
   a housing formed in part of plastic or composite materials and having an upper surface, a lower surface and a cavity said lower surface to have contact with a ground and being formed of plastic;
   a first coupling feature located on said upper surface and configured to cooperate with a second coupling feature on an arm of an excavator;
   a ground penetrating radar antenna mounted near said lower surface;
   a controller mounted within said cavity and configured to provide outgoing signals to the radar antenna, to receive incoming signals from the radar antenna and to interpret the incoming signals so as to provide implement output information;
   a wireless communication circuit mounted within said cavity and configured to transmit the implement output information; and
   a rotation unit mounted within said cavity to rotate said housing vis-à-vis said excavator arm.

2. The implement of claim 1 and also comprising a battery mounted within said cavity and configured to supply power at least to the controller, the rotation unit and to the wireless communication circuit.

3. The implement of claim 2 wherein a battery charger for charging the battery is mounted within said cavity.

4. The implement of claim 3 further comprising a battery charger cable having a stowed configuration in which the battery charger cable is accommodated within the cavity and a deployed configuration in which the battery charger cable extends outside the cavity for connection to an external power source.

5. The implement of claim 1, said controller to determine an axial orientation of a line target from the output of said antenna during said rotation.

6. The implement of claim 5, wherein said axial orientation is the rotation angle at which said antenna achieves a maximum signal value.

7. The implement of claim 5, said controller to instruct said excavator to move radially after each of at least two rotations to scan an item of interest and to determine whether or not said item of interest is a line target from the output of said antenna during said scans.

8. The implement of claim 1 further comprising a geolocation antenna for providing geolocation data in relation to the implement.

9. The implement of claim 1 further comprising a vector sensor configured to monitor motion of the implement.

10. The implement of claim 1 further comprising an electromagnetic radiation sensor configured to detect electromagnetic radiation emitted by buried articles; wherein the controller is configured to receive data from the electromagnetic sensor, wherein the implement output data includes data derived from the electromagnetic sensor.

11. The implement of claim 10 further comprising an electromagnetic radiation emitter configured to induce electromagnetic radiation in a target article for sensing by the electromagnetic radiation sensor.

12. A machine assembly comprising:
   an implement in accordance with claim 1; and
   a machine having an excavator arm configured to receive the implement.

13. The machine assembly of claim 12 further comprising a computing device configured to receive the implement output information transmitted by the wireless communication circuit configured to transmit and to generate a graphical representation of the implement output information for viewing by an operator of the machine assembly.

14. The machine assembly of claim 13 wherein the computing device is a portable wireless device.

15. The machine assembly of claim 12 wherein the machine comprises said second coupling feature and said second coupling feature is hydraulically or electrically actuatable to engage with and disengage from said first coupling feature.

* * * * *